UNITED STATES PATENT OFFICE.

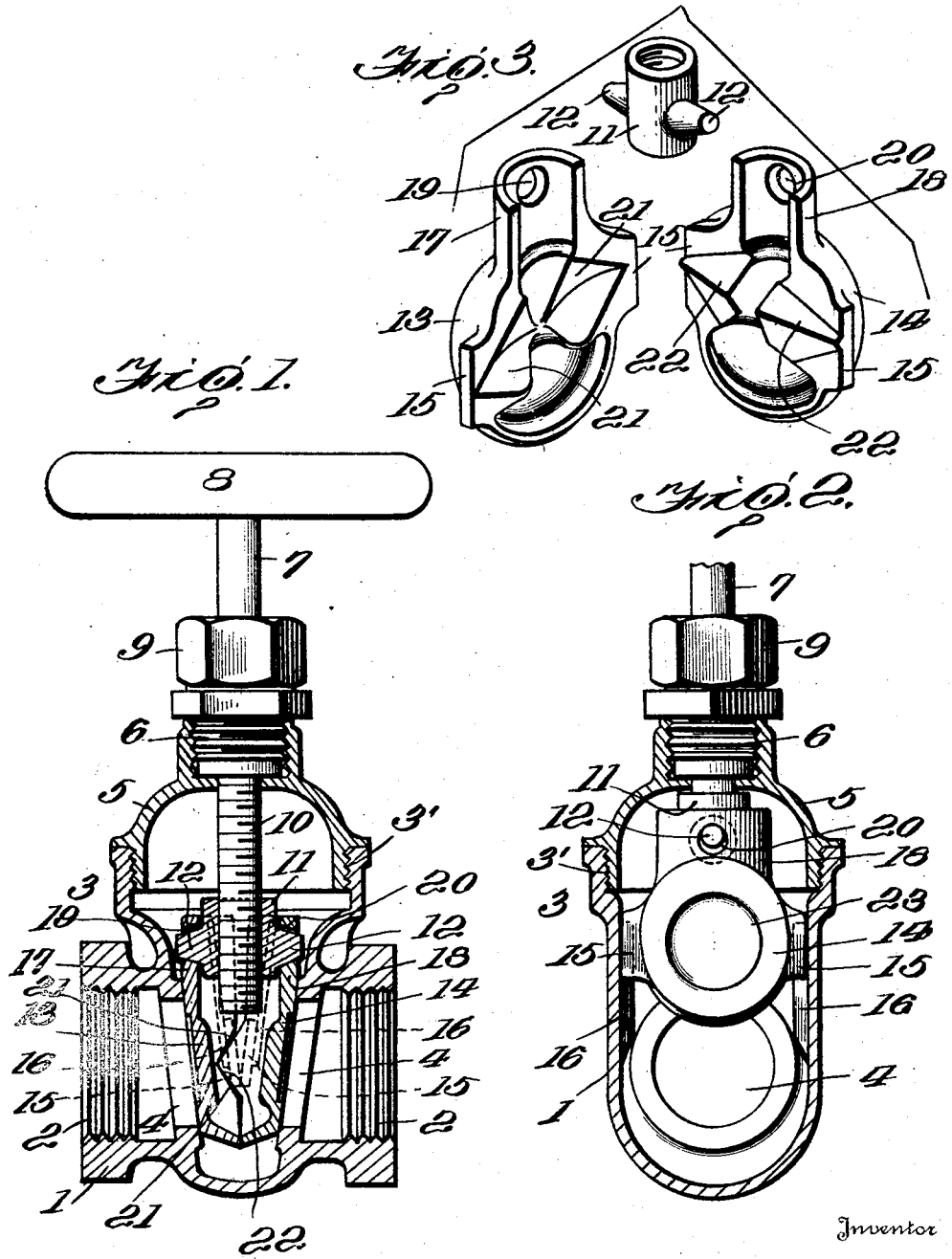

OWEN L. WHITEMAN, OF COXSACKIE, NEW YORK.

GATE-VALVE.

1,304,228.     Specification of Letters Patent.     Patented May 20, 1919.

Application filed February 4, 1918. Serial No. 215,320.

*To all whom it may concern:*

Be it known that I, OWEN L. WHITEMAN, a citizen of the United States, residing at Coxsackie, in the county of Greene and State of New York, have invented certain new and useful Improvements in Gate-Valves, of which the following is a specification, reference being had therein to the accompanying drawing.

This invention relates to certain new and useful improvements on my patent for gate-valve, #681,900, granted to me September 3rd, 1901, the object being to simplify the construction in order to obtain the movement or oscillation of the disks in two directions to insure a complete seating of the valve and a wedging action as the disks are forced in contact with their seats.

Another and further object of the invention is to provide a novel form of operating nut whereby the disks carried thereby are allowed a rocking movement in a horizontal and a vertical direction.

Another and further object of the invention is to provide a construction of gate-valve in which the cost of manufacturing the same is greatly reduced and an exceedingly simple construction is provided whereby the desired results can be obtained and in such a manner that all danger of the parts becoming displaced in operation is eliminated.

Other and further objects and advantages of the invention will be hereinafter set forth and the novel features thereof defined by the appended claims.

In the drawings:

Figure 1 is a longitudinal vertical section through a gate-valve constructed in accordance with my invention;

Fig. 2 is a transverse section showing the gate in elevation and in open position; and Fig. 3 is a perspective view of the gate disks and nut detached.

Like numerals of reference refer to like parts in the several figures of the drawings.

In carrying out my invention I employ a valve casing 1 which is provided with oppositely disposed threaded nipples 2 and a valve chamber 3 having oppositely disposed converging valve seats 4 upon which are adapted to be seated the valve-gates or disks as will be hereinafter fully described. The valve chamber is provided with a threaded neck 3' in which is screwed a threaded cap 5 having mounted therein a nut 6 carrying a valve stem 7 having a hand wheel 8 for turning the same. The nut 6 carries a nut 9 forming a stuffing box which is of the ordinary construction now in use.

The lower end of the valve stem 7 is provided with a threaded portion 10 on which is mounted a nut 11 which is provided with oppositely disposed tapering lugs 12 which gradually decrease in diameter from the center outwardly.

Arranged to slide vertically within the valve chamber of the casing are a pair of disks 13 and 14 having lugs 15 adapted to travel in contact with spaced guide flanges 16 formed on the interior of the valve casing in order to guide the valve disks in their opening and closing movements and to hold the disks together. The disks 13 and 14 are provided with substantially semi-circular neck portions 17 and 18 provided with openings 19 and 20 which are counterbored to provide inclined or conical walls to receive the tapering lugs 12 of the nut 11 in order to allow the disks to move in a horizontal and vertical direction thereon.

The disk 13 is provided with recesses 21 to each side of the longitudinal center thereof, substantially V-shaped in cross section and gradually decreasing in size from the center outwardly in order to provide opposing inclined faces into which are adapted to extend outwardly extending lugs 22 formed on the disk 14, said lugs being substantially V-shaped in cross section and gradually decreasing in size from the center outwardly, forming bearing surfaces upon which the disks are adapted to rock upon one another in a vertical and horizontal direction.

The bearing recesses and lugs of the disks 13 and 14 are formed with angled faces constructed on different angles, one being formed on the angle of 60 degrees and the other on the angle of 58 degrees in order to allow the rocking movement of the disks in respect to one another in a horizontal and a vertical direction. The outer faces of the disks 13 and 14 are provided with ground bearing surfaces 23 which are adapted to engage the valve seats 4 so as to form a perfect seat as the disks are forced down into the valve chamber by the turning of the handle 8.

In the operation of the gate-valve, assuming that the disks are in raised position, as shown in Fig. 2, as the valve stem is turned the nut 11 travels on a threaded stem 10 on the valve stem 7 and causes the disks to be moved downwardly, the same being guided in a downward movement by the guide flanges 16 so as to obtain a wedging action of the disks on the converging seats and at the same time allowing the disks to move in a horizontal and vertical direction so that each disk automatically adjusts itself to its seat.

From the foregoing description it will be seen that I have provided a gate-valve with a pair of valve gates or disks carried loosely by a nut upon which they are mounted so that each disk is allowed to move independent of the other disk and by the particular construction of bearing faces formed by the recesses and lugs on the inner faces of the disks, the disks are allowed a horizontal and a vertical movement so as to obtain a rocking adjustment whereby a perfect seating of the disks upon their seats is obtained.

I claim:

1. A gate-valve comprising a casing having converging valve seats, a pair of disks mounted within said casing between said valve seats, said disks being capable of moving independent of one another in a horizontal and vertical direction, each of said disks being provided with a substantial semi-circular neck having a conical bore, a valve stem mounted in said casing provided with a threaded portion and a nut working on said threaded valve stem having conical lugs extending into the conical bores of the neck of said disk.

2. A gate-valve comprising a valve casing having a pair of disks movably mounted therein, said disks being provided with bearing surfaces for allowing said disks to rock upon one another in a horizontal and vertical direction, and an operating nut provided with oppositely disposed lugs upon which said disks are loosely mounted.

3. A gate-valve comprising a valve casing provided with converging valve seats and guide flanges, opposing valve disks provided with lugs slidably mounted in the guide flanges of said casing, said valve disks being provided with bearing portions for allowing said disks to move vertically and horizontally in respect to one another, said disks being provided with neck portions having conical bores, a valve stem provided with a threaded portion and a threaded nut working on said valve stem having conical lugs working loosely in the conical bores of the necks of said disks.

In testimony whereof I hereunto affix my signature in the presence of two witnesses.

OWEN L. WHITEMAN.

Witnesses:
 CHAS. L. STONE,
 W. A. BARLOW.

Copies of this patent may be obtained for five cents each, by addressing the "Commissioner of Patents, Washington, D. C."